June 2, 1931.  E. MAYE  1,808,675
INTERNAL COMBUSTION ENGINE
Filed Dec. 27, 1927
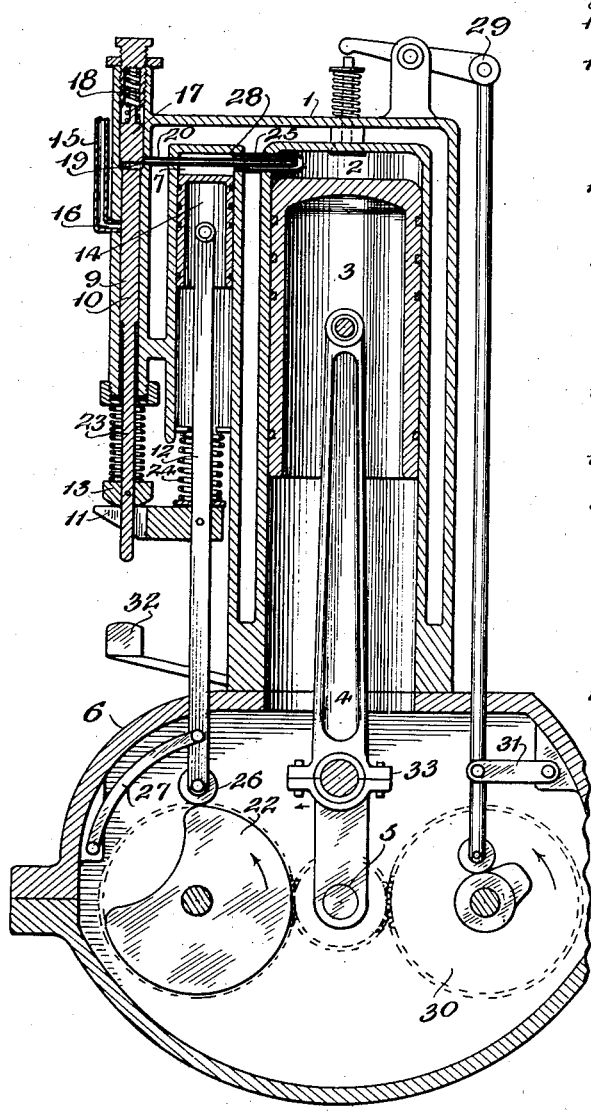
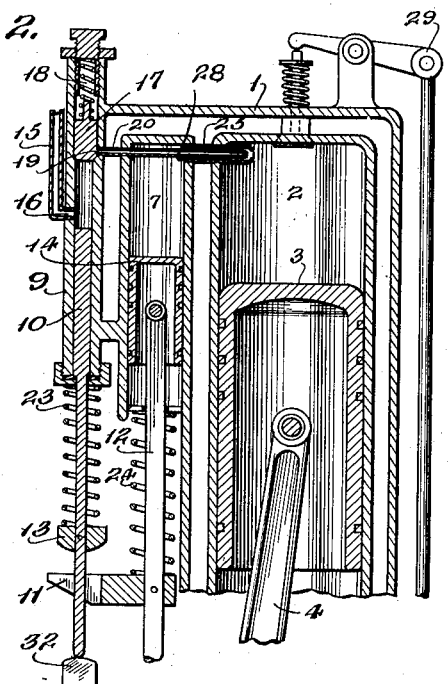
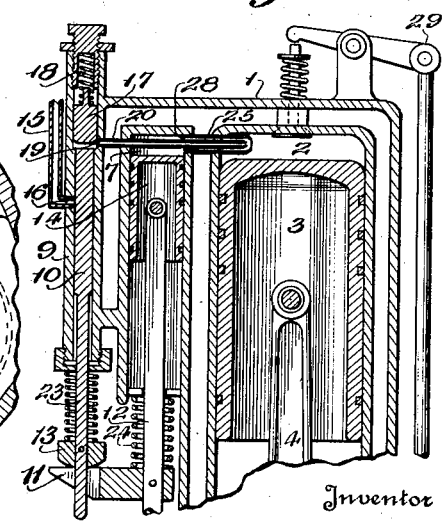
Inventor
Edward Maye.
By Spear, Middleton, Donaldson & Hall
Attorneys Patented June 2, 1931

1,808,675

UNITED STATES PATENT OFFICE

EDWARD MAYE, OF WASHINGTON, DISTRICT OF COLUMBIA

INTERNAL COMBUSTION ENGINE

Application filed December 27, 1927. Serial No. 242,859.

This invention relates to improvements in internal combustion engines of the type using the heavier, non-volatile oils, such as kerosene, fuel oil, etc., and has for its purpose the simplification of this type of engine and the providing of same with a positive and accurate means of fuel injection and ignition.

Briefly, this invention seeks to combine the best features of both the Diesel and the solid-injection types of oil engines with certain practical improvements thereon.

In the present invention I have combined with each working cylinder of the engine an auxiliary air-compressing cylinder and a fuel-injection pump. Both of these devices are combined and coordinated in such a way as to reduce working parts to the minimum and at the same time secure the greatest possible atomization of the fuel without the objectionable refrigerating effects of the Diesel engine or the undesirable detonating habits of the solid-injection types of engine. Among the superior qualities which I claim for the engine comprising this invention is a completely atomized charge of fuel, injected simultaneously and thoroughly mixed with a volume of highly-compressed air, producing an evenly expanding combustion effect exceeding that of the Diesel cycle and at the same time being subject to an accuracy of timing and speed control not hitherto associated with high-compression, internal-combustion engines.

Perhaps the greatest advantage to be derived from this type of internal combustion engine construction is that it enables an engine of a given power output to be constructed much lighter than where a higher pressure is used in the combustion chambers. Also, the freedom from heavy detonation when the fuel charge is more gradually ignited is not so destructive to the frame and other parts.

The principle of this invention is readily applicable to engines employing either the two-stroke or four-stroke cycle, and it is assumed that such common mechanical operating devices as may be necessary to adapt this invention to specific styles of engines need not be illustrated nor described in order to enable anyone skilled in the art to construct an engine embodying this invention, yet varying in minor mechanical details from the machine specifically described hereinafter and illustrated in the accompanying drawings.

However, the specific embodiment so illustrated and described is exhibited for the purpose of illustrating the invention and without intent to limit the scope of the protection claimed therefor.

Referring to the drawings forming part of this application:

Fig. 1 is a transverse sectional view of a four-stroke cycle internal combustion engine embodying mechanism constructed and assembled according to the present invention, showing the parts in the position they assume at the moment injection and ignition takes place.

Fig. 2 is a detailed sectional view of the upper part of the cylinder during the compression stroke.

Fig. 3 is a sectional view similar to Fig. 1, but detailing only the upper part of the cylinder at the moment of injection and ignition.

In these drawings the different parts have not been shown in the exact relative sizes they should appear in the finished engine, but the smaller parts have been shown on an enlarged scale for the purpose of better illustrating their construction.

Referring in more detail to the several views of the drawings, 1 designates a water jacketed housing forming a cylinder 2 wherein a piston 3 is mounted for reciprocation. This piston is operatively connected by means of a connecting rod 4 with a crank shaft 5 that is rotatably mounted in the crank case 6 at the lower end of the housing 1.

On the upper end of the cylinder casing is located a water jacketed air cylinder 7 wherein a piston 14 is adapted to be reciprocated. Attached to the air cylinder 7 is a fuel injection pump 9 whose plunger 10 is operated by means of the finger 11 located on connecting rod 12 engaging the collar 13 as the air piston 14 is lifted. This forces upward and inward the fuel plunger 10 which pushes ahead of it the fuel oil acquired through the feed pipe 15 and forces the plug 17 upward against its control spring 18. When the plug 17 clears the spray pipe inlet 19, the fuel is forced along the spray pipe 20 to the combined air pipe and fuel spray pipe orifice, within the working cylinder of the engine.

All this action occurs at nearly the same time when the working piston of the engine arrives at or near the highest point of compression in the working cylinder. From this it will readily be understood that in the operation of a regular four-stroke cycle engine the following operations take place. On the expansion stroke of the working piston the air piston 14 and the fuel plunger 10 remain at the upper or inner point of their respective strokes. This is also true during the two succeeding strokes of the engine piston; i. e., the scavenging and intake strokes. At the end of the intake stroke the engine cylinder is presumed to be filled with pure air. Just at this point the cam 22 operating the connecting rod 12 releases that rod, causing the air piston 14 and the fuel plunger 10 to be drawn down or out of their respective cylinders, aided by the springs 23 and 24. The plug 17 is forced down into the fuel pump cylinder by the action of the spring 18, thus closing the fuel outlet 19. The fuel inlet pipe orifice 16 is cleared by the plunger 10 and a quantity of liquid fuel is permitted to flow into the pump cylinder 9. This flow of fuel is aided by the partial vacuum existing in the pump cylinder caused by the withdrawal of the plunger 10 and the sealing of the upper part of the cylinder by the plug 17.

The air piston 14 also having been withdrawn toward the lower end of its stroke, the air cylinder 7 becomes filled with fresh air forced in through the air pipe 25 from the working cylinder, the piston of which is now beginning its compression stroke. When the desired point on the compression stroke has been reached, the cam 22 again lifts the rod 12 through the roller 26 and link 27 and causes the air piston 14 and fuel plunger 10 to be forced quickly into their respective cylinders. This instantly forces a quantity of super-compressed fresh air from the air cylinder 7 into the engine cylinder 2 through the air pipe 25, at the same time that the fuel plunger 10 is forcing a charge of fuel through the fuel pipe 20. It will thus be seen that the liquid fuel and the super-compressed air from the two pipes 20 and 25 are caused to commingle at the point of combined orifice, and are injected into the engine cylinder in a highly combined state; the thoroughly atomized fuel being completely mixed with the superheated air. Complete combustion immediately takes place. The speed of combustion is governed by the speed with which the fuel and air are injected into the cylinder, which in turn is controlled by the particular shape or profile of the cam 22.

Reference to the drawings will show that the fuel spray pipe 20 passes through and is surrounded by the air pipe 25 from the point 28, where the latter leaves the air cylinder 7 to the combined orifice, a sufficient clearance between these pipes being provided to accommodate the flow of air to and from the air cylinder. Obviously these pipes may readily be arranged in some other fashion, but the arrangement here illustrated and described is preferred because of its simplicity and the greater atomizing effect of the combined orifice.

Because of the very small quantity of fuel injected into the working cylinder, during operation of the engine, it may be advisable to place the fuel injection pump in a horizontal position similar to that occupied by the fuel spray pipe 20. Also, a perforated spray head on the spray orifice, might assist atomization of the fuel, and the installation of a spring controlled check valve in the fuel spray pipe 20 near the spray orifice, would eliminate dribbling of the fuel after the injection had taken place, but these modifications being obvious, they are not shown.

However, all these are mere structural details which may or may not be incorporated in an engine embodying the basic elements of this invention. I prefer the arrangement as set forth in the drawings, believing that the small diameter of the spray pipe will obviate trouble from dribbling fuel. Also, the action of the plug 17 in sealing off the intake end of the fuel spray pipe will assist in minimizing dribbling of the very small amount of fuel remaining in the pipe after each stroke. The shortening of the fuel spray pipe 20 to a point just past 28 together with the enlargement of the remainder of the air pipe 25, would also assist in eliminating dribbling of the uninjected fuel.

In the drawings, the parts marked 29, 30 and 31 relate to the operating mechanism of a conventional poppet valve, two of which would be used in a four-stroke cycle engine. In a two-stroke cycle engine a port exhaust is preferred, with the intake orifice connected to a rotary air pump for efficiency in scavenging. The governing mechanism is diagrammatically illustrated at 32, a block having a vertical travel controlled by a conventional type of governor and being moved thereby so as to check the descent of the fuel pump plunger stem 10 at any required point in its downward stroke, thus causing a variation in the length of the stroke of the plunger and controlling the quantity of liquid fuel injected at each stroke of the pump. The feed line 15 is provided with a conventional check valve. It is possible to vary the quantity of fuel injected, up to the volume of that portion of cylinder 9 between the feed pipe orifice 16 and the lowermost position of plug 17.

The connecting rod bearing is indicated at 33. The water jacket space surrounding the working and air cylinders is shown diagrammatically.

In practice it might be advisable to have the fuel injection pump separate from the main engine casting in order that it might readily be detachable for replacement or repair.

What I claim is:—

1. In an internal combustion engine, in combination with a working cylinder and piston, an air compressing cylinder and piston for compressing air to inject fuel into the working cylinder, an air pipe extending from an opening in the wall of the upper end of said air compressing cylinder into the upper end of said working cylinder, a cylinder and piston for pumping fuel into contact with the compressed air from the air compressing cylinder, a fuel injector tube extending from an outlet opening in the wall of the upper portion of the pump cylinder through and across the upper end of the air compressor cylinder and through its walls and the wall of the working cylinder and within said air pipe to a point adjacent the mouth of said air pipe and within the working cylinder, a fuel inlet to said pump cylinder, means for operating the air compressing piston, a finger on the compressor piston rod having an opening through which the fuel pump piston rod extends, and a collar fixed to said pump piston rod adapted to be engaged by said finger to move the pump piston by the compressor piston on the compression stroke.

2. In an internal combustion engine according to claim 1, means for checking the descent of the fuel pump piston rod at any desired point of its downward stroke, to regulate the position of the top of the piston relative to the fuel inlet to the pump cylinder.

In testimony whereof, I affix my signature.

EDWARD MAYE.